United States Patent Office 3,322,866
Patented May 30, 1967

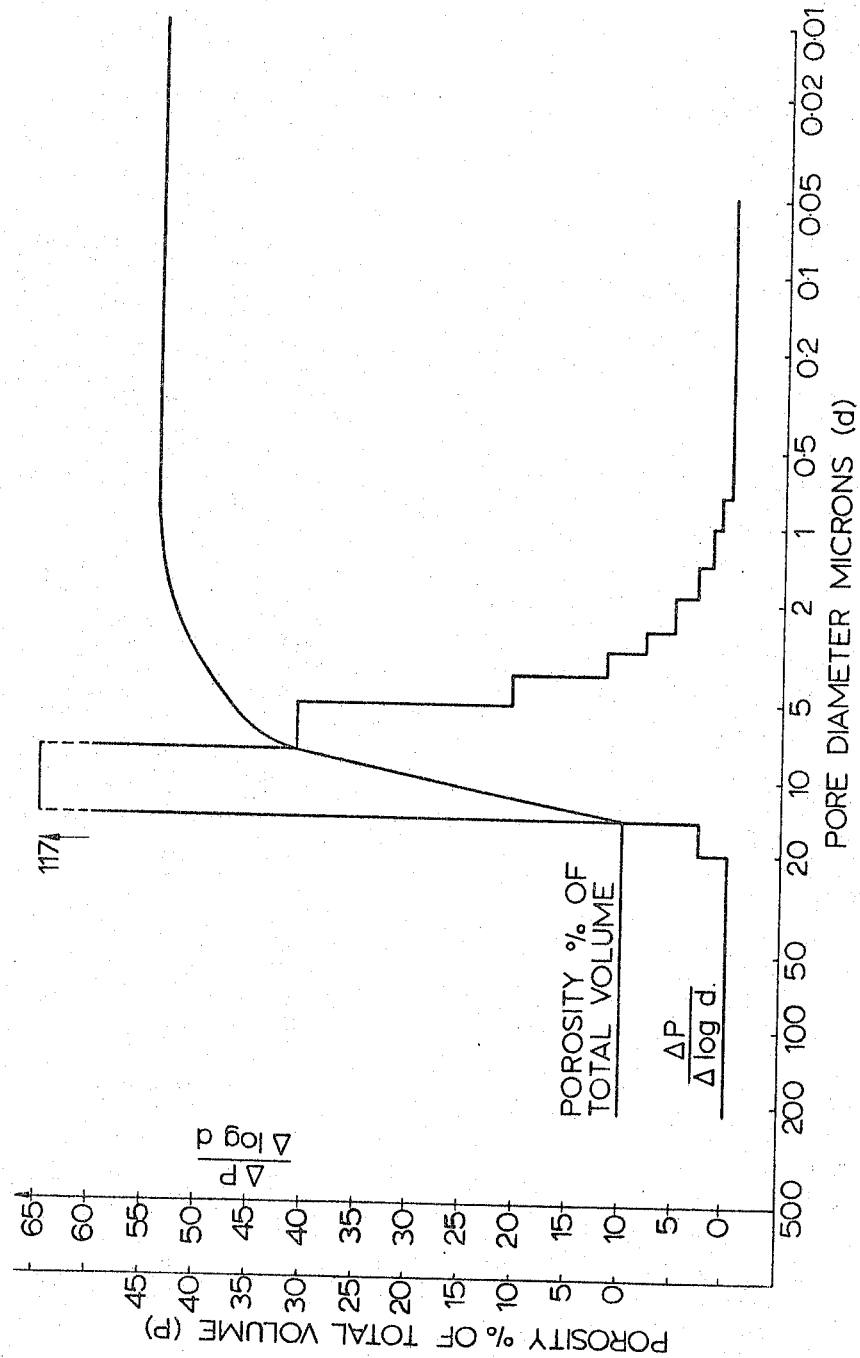

3,322,866
METHOD OF EXTRUDING CARBON ARTICLES
Jacques Bentolila and Leon Dubief, Chedde, France, and Michael Stuart Thomas Price, Weymouth, England, assignors to United Kingdom Atomic Energy Authority, London, England
Filed July 21, 1964, Ser. No. 384,085
Claims priority, application Great Britain, July 22, 1963, 28,835/63
5 Claims. (Cl. 264—29)

This invention relates to the manufacture of graphite. The invention chiefly relates to the manufacture of nuclear grade graphite having a fine structure.

In our co-pending patent application U.S. Ser. No. 384,636, filed July 23, 1964, there has been described a process for making and subsequently graphitizing carbonaceous extrusions. The particular products with which this process is concerned are graphitsable extrusions which result, after graphitisation, in a product having substantially no ultra fine pores viz. pores below about 0.1 micron diameter. Conventional practice in the preparation of raw coke for the manufacture of nuclear graphite is a heat treatment up to temperature of about 1400° C., an operation known as calcination.

One of the propositions on which the co-pending patent application was based was that the number of small open pores (below 0.1 micron diameter) in the graphite product is seen to be reduced as the calcination temperature of the coke ingredient was reduced. Manufacturing process considerations militate against the use of raw, or uncalcined coke (usually treated at about 450–500° C.), as attempts to make an extrudable material based on such cokes and having a low binder content (300–400 parts per thousand by weight) of orthodox type such as pitch, are remarkably unsuccessful. The material either will not extrude even under 250 kg./cm.² pressure, or result in extrusions which are very brittle and have a very poor surface.

The present invention is based on the discovery that in fact an extrudable material can be manufactured from uncalcined or semi-calcined coke by incorporating in the ground coke a special volatile organic binder which makes the particles sticky, but not plastic such that interlinking or adhesion between the coke grains is achieved due to their superficial plasticity, agglomerating the grains, and subsequently baking the product, the hydrocarbon binder being volatilised or decomposed during the baking process. By semi-calcined coke is meant coke heat treated to any temperature up to 750° C. It is preferable that the semi-calcined coke be ground before its calcination.

The volatile binder is preferably pine resin from the Landes. The baked product is preferably subjected to one or more impregnations with pitch in a manner known per se.

One process by means of which a carbonaceous product suitable for graphitisation to yield a structure without ultra fine pores will now be described:

Rew, i.e. uncalcined, petroleum coke to be used as the base filler material was that supplied by Shell from the Pernis refinery. This coke had been prepared at Pernis by thermal cracking of crude Venezuelian residue at 500° C. and its volatile content was 7–10%. The coke was ground.

Next a resin was selected for its ability to give the coke grains superficial plasticity and suitable resin was found to be pine resin. The resin having been broken up, was ground in a grinding machine down to 10 mm. particle size. The resin and coke were next mixed in suitable proportions in a mechanical mixer for 15 minutes. The mixture was kneaded for an hour, an operation which effected a temperature rise to 150° C. and caused the mix to agglomerate into a pasty consistency.

The material was then taken to a conditioning chamber where the temperature was maintained at about 100° C. It was then transferred to the extrusion chamber of a press again kept at about 100° C. and the pressure was reduced to 10 mm. Hg to degass the paste. The paste was extruded with the plunger speed of about 1.3 cm./min. The green product obtained by extrusion is then baked according to known methods at temperatures up to 900° C. at 6° C. per hr. Because the high volatile content of the coke (7% of the paste is composed of volatile matter), also because of the almost complete volatilisation of the pine resin binder (28% of the paste) considerable weight loss was incurred. Similarly a contraction in volume after baking occurs but this is not sufficient to counteract weight loss so that as a result the density of the baked product becomes lower than that of the unbaked state.

In spite of these quantitive changes the texture of the product does not deteriorate but rather, on the contrary the texture has been found, on examination, to be particularly good.

The low density, baked product was then given two impregnations of pitch by conventional methods, the product being degassed for one hour before each impregnation. The impregnant was pitch diluted with 6% anthracene oil applied at a pressure of 8 kg./cm.² for one hour. After impregnation the product was baked again for six hours up to 800° C.

The product was then graphitized by heating as follows:

400° C. per hour up to 1200° C.
300° C. per hour up to 2700° C.

with soaking at 2700° C. for 30 minutes.

As shown in the accompanying drawing which is a diagram which plots pore diameter $d$ in microns as the abscissa and porosity P expressed as percentage of total pore volume formed by open pores and its differential $$\Delta P/\Delta \log d$$

as ordinates, there is substantially no ultra fine porosity and as such the product is particularly suited to treatment designed to reduce its permeability and also is particularly suited for use in nuclear reactors operating at high temperatures.

We claim:
1. A method of forming an extruded graphite component of nuclear grade graphite of high density which resides in selecting as the major portion of the starting material a raw coke of petroleum origin, the remainder constituting binder material, heat treating the coke at a temperature below 750° C., grinding the treated product and mixing it with pine resin, extruding the component and baking the extruded component to produce a carbonaceous artifact having the majority of its open pores greater than 1 micron diameter, subjecting the component to an impregnation process to fill its open pores and then heating the impregnated component to graphitizing temperature.

2. A method of forming an extruded graphitic component of nuclear grade graphite of high density which resides in selecting as the major portion of the starting material a raw coke of petroleum origin, the remainder constituting binder material, heating the coke at temperature below 750° C., grinding the coke into grains, mixing the ground coke with pine resin to form a mixture of extrudable consistency, extruding the mixture to form a green carbonaceous component, baking the component whereby a carbonaceous product is formed having the majority of its open pores greater than 1 micron diameter, subjecting the product to at least one impregnation process to fill its open pores and then heating the product to graphitizing temperature to form a graphitic component.

3. A method as claimed in claim 2 in which the coke is ground and mixed with pine resin ground down to a particle size of about 10 mm.

4. A method as claimed in claim 3 in which the coke and resin are kneaded together to form a paste and then degassed before extrusion.

5. A method as claimed in claim 2 in which the baked product is given a number of impregnations with a carbonaceous filler, the product being degassed between each impregnation and baked after the final impregnation.

References Cited

UNITED STATES PATENTS

| | | | |
|---|---|---|---|
| 2,847,710 | 8/1958 | Pitzer | 264—109 |
| 3,010,882 | 11/1961 | Brachy et al. | 264—29 |
| 3,089,195 | 5/1963 | Woodburn | 264—29 |
| 3,102,041 | 8/1963 | Sandberg | 106—56 XR |
| 3,126,430 | 3/1964 | Price | 264—29 |

FOREIGN PATENTS 664,517   6/1963   Canada.

OTHER REFERENCES

Rose et al.: Condensed Chemical Dictionary, 6th edition, Rheinhold, New York, p. 988.

ROBERT F. WHITE, *Primary Examiner.*

J. A. FINLAYSON, *Assistant Examiner.*